US009147947B2

(12) United States Patent
Beneken et al.

(10) Patent No.: US 9,147,947 B2
(45) Date of Patent: Sep. 29, 2015

(54) PLUG-IN CONNECTOR HOUSING

(75) Inventors: Thomas Beneken, Schalksmuehle (DE); York Dobrick, Osnabrueck (DE); Stefanie Damsch, Luebbecke (DE); Georg Staperfeld, Osnabrueck (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 0 days.

(21) Appl. No.: 14/118,268

(22) PCT Filed: Mar. 28, 2012

(86) PCT No.: PCT/DE2012/100079

§ 371 (c)(1), (2), (4) Date: Apr. 4, 2014

(87) PCT Pub. No.: WO2012/155894

PCT Pub. Date: Nov. 22, 2012

(65) Prior Publication Data

US 2014/0334871 A1 Nov. 13, 2014

(30) Foreign Application Priority Data

May 18, 2011 (DE) ......................... 10 2011 106 293

(51) Int. Cl.

| | |
|---|---|
| ***F16B 17/00*** | (2006.01) |
| ***H01R 4/26*** | (2006.01) |
| ***H01R 4/24*** | (2006.01) |
| ***H01R 4/60*** | (2006.01) |
| ***H01R 13/502*** | (2006.01) |
| ***H01R 13/6581*** | (2011.01) |
| *H01R 13/6474* | (2011.01) |

(52) U.S. Cl.

CPC *H01R 4/26* (2013.01); *F16B 17/00* (2013.01); *H01R 4/24* (2013.01); *H01R 4/60* (2013.01); *H01R 13/502* (2013.01); *H01R 13/6581* (2013.01); *H01R 13/6474* (2013.01); *Y10T 403/70* (2015.01)

(58) Field of Classification Search

USPC .......................................... 439/668, 691, 578

See application file for complete search history.

(56) References Cited

U.S. PATENT DOCUMENTS

| | | | | |
|---|---|---|---|---|
| 4,695,110 | A * | 9/1987 | Wasserlein | 439/289 |
| 4,895,525 | A * | 1/1990 | Leonardo | 439/99 |
| 5,989,053 | A * | 11/1999 | Wheeler | 439/387 |
| 6,953,350 | B2 * | 10/2005 | Shiu | 439/79 |
| 7,641,520 | B2 * | 1/2010 | Marino | 439/668 |

(Continued)

FOREIGN PATENT DOCUMENTS

| | | |
|---|---|---|
| DE | 21 41 550 | 1/1973 |
| DE | 92 18 209 | 10/1993 |

(Continued)

*Primary Examiner* — Victor MacArthur

(74) *Attorney, Agent, or Firm* — Jacobson Holman, PLLC

(57) ABSTRACT

The invention relates to a plug connector housing consisting of at least one housing upper part and at least one housing lower part which together form a plug connector housing. The housing upper part and the housing lower part each have a contact surface, said contact surfaces being at least partly in contact with each other when the housing upper part and the housing lower part are connected to each other. The housing upper part and the housing lower part are made of an electrically conductive material, said housing upper part and lower part having a surface coating that protects against corrosion for example, and the contact between the two contact surfaces is formed along an edge.

2 Claims, 2 Drawing Sheets

(56) References Cited

U.S. PATENT DOCUMENTS

Figure 1:
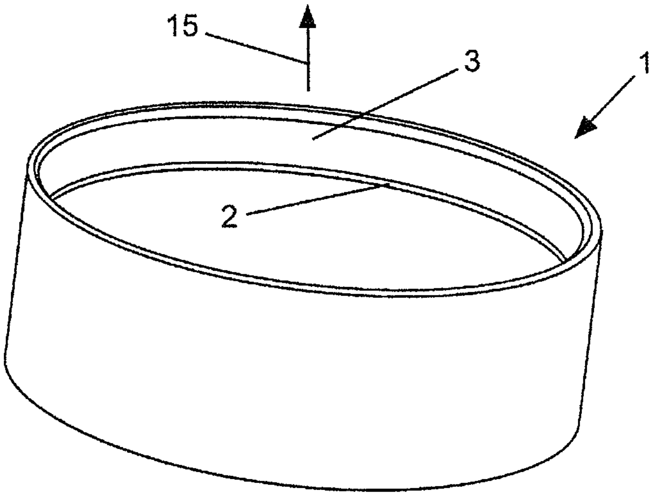

| | | | | |
|---|---|---|---|---|
| 7,753,715 | B2 * | 7/2010 | Freakes | 439/395 |
| 7,828,593 | B2 * | 11/2010 | Gilliam | 439/578 |
| 8,708,733 | B2 * | 4/2014 | Parrish | 439/395 |
| 2002/0025722 | A1 * | 2/2002 | Inagawa et al. | 439/610 |
| 2003/0155147 | A1 * | 8/2003 | Robinson | 174/65 SS |
| 2008/0009198 | A1 * | 1/2008 | Marino | 439/668 |
| 2009/0053931 | A1 * | 2/2009 | Islam | 439/578 |
| 2009/0314056 | A1 * | 12/2009 | McCauley et al. | 73/23.31 |
| 2010/0087090 | A1 * | 4/2010 | Islam | 439/578 |
| 2010/0164223 | A1 * | 7/2010 | Curtiss et al. | 285/24 |
| 2010/0229381 | A1 * | 9/2010 | Freakes | 29/825 |
| 2010/0255734 | A1 * | 10/2010 | Nakata et al. | 439/877 |
| 2011/0039449 | A1 * | 2/2011 | Montena | 439/585 |
| 2013/0065424 | A1 * | 3/2013 | Parrish | 439/391 |
| 2014/0124140 | A1 * | 5/2014 | Verheyden et al. | 156/350 |
| 2014/0334871 | A1 * | 11/2014 | Beneken et al. | 403/345 |

FOREIGN PATENT DOCUMENTS

| | | |
|---|---|---|
| EP | 0957540 | 11/1999 |
| GB | 2 265 262 | 9/1993 |

* cited by examiner

PLUG-IN CONNECTOR HOUSING

This is a national stage of PCT/DE12/100079 filed Mar. 28, 2012 and published in German, which has a priority of German no. 10 2011 106 293.2 filed May 18, 2011, hereby incorporated by reference.

The invention relates to a plug-in connector housing according to the preamble of claim 1.

Such plug-in connector housings contain contact elements, which for example forward the electric power, light-waves, and also pneumatic signals.

PRIOR ART

The metallic plug-in connector housings are for example used for electro-magnetically insulating the interior of the housing, which contains the above-mentioned contact elements.

The quality of such a shielding is commonly determined by a measurement, the so-called transfer impedance (also called coupling resistance). The lower the transfer impedance, the higher the insulating effect of the plug-in connector housing. The determination of the transfer impedance is a common task for a technician of a test lab in electric industry.

EP 957540 A2 shows an electrically insulated plug-in connector housing. In order to electrically connect the two housing parts, the seal is provided as an electrically conductive element.

DE 10 2005 040 425 A1 shows a plug-in connector for conduits through an opening of a device. The contact site between the device socket and the plug is realized via a brass ring. The components of the plug-in connector visible from the outside are coated with a surface resistant to environmental influences.

In order to improve the corrosion protection in metallic plug-in housings, the surfaces of the individual housing parts are provided with a thin coating, for example.

DE 20 2004 014 020 U1 discloses a plug-in connector, showing an electrically conductive surface coating comprising nickel.

For technical production reasons, frequently sections of the housing parts of the plug-in connector are coated, which come into contact with each other in the plugged-in state. These sections are also called contact areas.

Advantageously, the coating is made from a compound comprising a basic silicon framework and hydrogen, the so-called silanes.

WO 99 14 399 A1 shows a method for coating with a corrosion protection comprising a metallic surface showing such silanes.

The electric contact between the silanated housing parts is worse compared to uncoated housing parts. This results in increased transfer impedance and simultaneously worsens the insulating effect of such plug-in connector housings.

OBJECTIVE

The objective of the invention is to suggest a plug-in connector housing, which is resistant to corrosion and additionally shows good insulating features.

The objective is attained in the characterizing features of claim 1.

Advantageous embodiments of the invention are stated in the dependent claims.

A plug-in connector housing usually comprises two housing parts, a housing top and a housing bottom. The housing top is combined with the housing bottom in a certain plug-in direction. Additional housing parts (or attachments) may be provided. For example, the cable outlet generally located at the housing top may be provided as an additional housing part. The separate cable outlet can be screwed in via a thread into the housing top. The housing top can then show several positions, in which the cable outlet can be screwed in. This allows for even more flexible utilization of the plug-in connector housing.

Generally the housing top and the housing bottom are produced from a metallic, electrically conductive material. This way the plug-in connector housing is sufficiently robust for its use in challenging industrial environments. Another advantage lies in the electromagnetic insulation of the environment from the interior of the housing.

In industrial environments, plug-in connector housings are frequently subject to splashing water and/or chemicals (for example printer ink of printing machines). In order to protect the plug-in connector housing from corrosion, the individual housing parts are frequently provided with a surface coating.

Advantageously, the surface coating represents a silane layer. This is also called silanation of the plug-in connector housing.

In the present publication, the term "housing half" is used for both the housing top as well as the housing bottom.

After at least one of the housing halves has been equipped with contact elements and they have been connected to the individual conductors of a cable to be connected, the housing halves are plugged together in the plug-in direction and subsequently screwed together, for example. Here, contacting occurs between the plugged in housing halves at the so-called contact surfaces.

The above-mentioned plug-in direction is generally oriented according to the axes of the individual parts.

When coating the surfaces of the housing halves here, one contact area of a housing half is also always coated. It may even occur that the contact areas of both housing halves are coated.

Any surface coating, particularly the above-discussed silanation, always reduces the electric conductivity between the contact areas of the housing halves. This way the above-mentioned transfer impedance is reduced and simultaneously the electromagnetic insulating effect of such plug-in connector housings is worsened.

According to the invention, the problem is attained such that the contact area of one housing part forms an edge in reference to the other contact area of the other housing part. The contacting between the contact areas is embodied linearly.

When plugging together the housing halves, the edge of one contact area cuts into the surface coating of the other contact area. The surface coating is hereby penetrated and this way an electric contact is established between the two housing halves.

In other words: When the two housing parts are plugged together, the sharp edge of one contact area scrapes the coating off the other contact area so that the electrically conductive basic material of the housing part reappears. Simultaneously, the coating material is removed from the edge of the other contact area. Accordingly now the uncoated edge of one contact area linearly contacts the uncoated other contact area in an electrically conductive fashion.

EXAMPLE OF EXECUTION

An example of execution of the invention is shown in the drawings and in the following is explained in detail. It shows:

FIG. 1 a perspective illustration of a housing top

Figure 2:
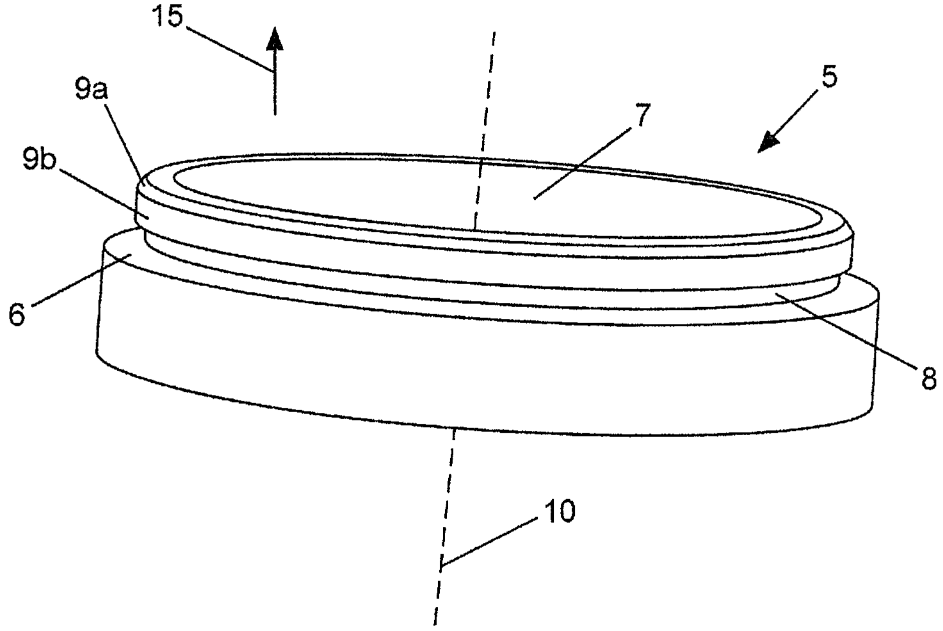

FIG. 2 a perspective illustration of a housing bottom, and

Figure 3:
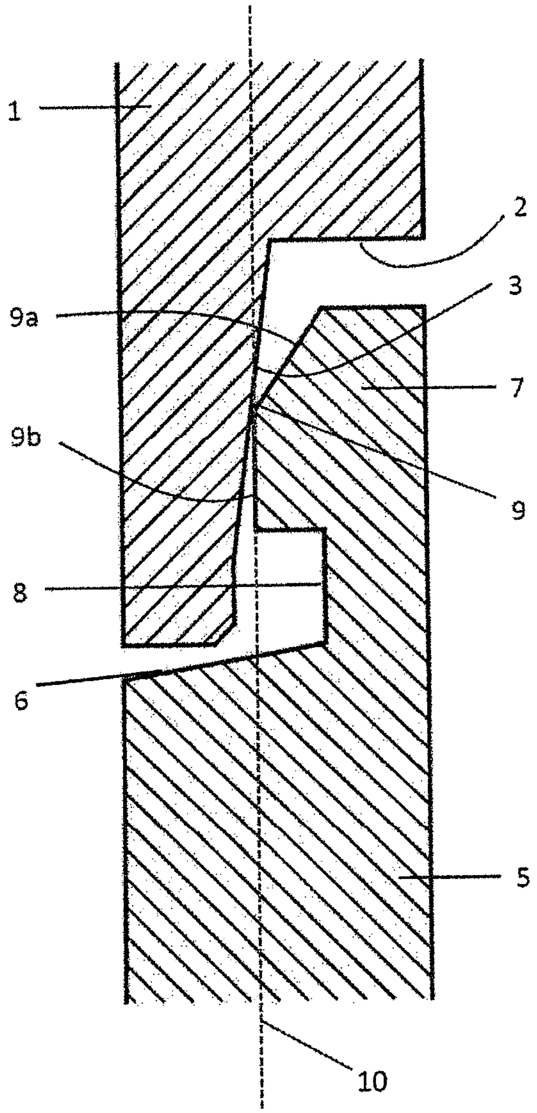

FIG. 3 a cross-section of the housing parts plugged together.

FIG. 1 shows a perspective illustration of a housing top. The housing top 1 shown here is essentially embodied cylindrically. However, any other geometric form is also possible, for example a cubical one. A potential housing form is disclosed in the above-cited EP 957540 A2 of the applicant.

On the inside, the housing top 1 is provided with a circumferential stop 2, which constricts the interior diameter of the housing top 1. The contact area 3 of the housing top 1 extends above the circumferential edge 2.

FIG. 2 shows a perspective illustration of a housing bottom. The housing bottom 5 is embodied in a plug-in compatible fashion in reference to the housing top 1. At the plug-in side, the housing bottom 5 comprises an exterior circumferential edge 6. On the inside, along the circumferential edge 6, an axially projecting ring 7 is formed.

The ring 7 comprises a circumferential notch 8. A straight section is discernible at the top of the notch 8 (seen in the plug-in direction 15), which forms a first partial area **9*b* of the contact area of the housing bottom 5. Further above, a section 9*a* is discernible, angular towards the outside, which forms the second partial area 9*a* of the contact area of the housing bottom 5. Together the two partial areas form an obtuse angle, with its tip forming an edge 9. When the housing parts are plugged together, the edge 9 contacts the contact area 3 of the housing top 1**.

FIG. 3 shows a cross-section of the housing parts 1, 5 plugged together. Here it is clearly discernible that the edge 9 of the contact area **9*a*, 9*b* of the housing bottom 5 contacts the contact area 3 of the housing top 1** only at one point. In a three-dimensional illustration this point becomes linear.

When the housing parts 1, 5 are plugged together, the above-described edge 9 acts like a blade scraping the coating off the housing top 1, so that the uncoated surface appears. By the friction forces, the coating material is simultaneously removed from the edge 9, so that the now uncoated sections of the housing part 1, 5 contact each other.

LIST OF REFERENCE CHARACTERS

Plug-In Connector Housing
1 Housing top
2 Circumferential stop
3 Contact area
4
5 Housing bottom
6 Circumferential edge
7 Projecting ring
8 Notch
9 Edge (contact area), **9*b* straight section, 9*a*** angular section
10 Axis
15 Plug-in direction

The invention claimed is:

1. A plug-in connector housing, comprising at least one housing top (1) and at least one housing bottom (5), which together form a plug-in connector housing, with the housing top (1) and the housing bottom (5) being produced from an electrically conductive material, with both surfaces of the housing top (1) and the housing bottom (5) having a protective coating, with the housing top (1) and the housing bottom (5) each comprising a contact area (3, **9*a*, 9*b*) which contact each other at least partially when the housing top (1) and the housing bottom (5) are connected to each other, one of said housing top and housing bottom contact areas is formed from two partial areas (9*a*, 9*b*), lying at an obtuse angle with respect to each other and joined at a curved edge (9**), wherein the curved edge is in contact with the other of said housing top and housing bottom contact areas to form the contact therebetween when the housing top and housing bottom are connected to each other, wherein said curved edge acts as a blade that scrapes through the protective coating on the surface of said other housing when the housing top and the housing bottom are connected to each other, wherein the protective coating on the curved edge is simultaneously removed from the curved edge so that there is an uncoated electrically conductive contact between the housing top and bottom.

2. The plug-in connector housing according to claim 1, wherein the obtuse angle lies between 110° to 150°.

* * * * *